United States Patent [19]

Tanaka et al.

[11] Patent Number: 4,901,262

[45] Date of Patent: Feb. 13, 1990

[54] ELECTRONIC CALCULATOR PROVIDING FLEXIBLE CONSTANT UTILIZATION

[75] Inventors: Yasuharu Tanaka; Ken'ichi Inui, both of Nara, Japan

[73] Assignee: Sharp Corporation, Osaka, Japan

[21] Appl. No.: 136,676

[22] Filed: Dec. 22, 1986

[30] Foreign Application Priority Data

Dec. 23, 1987 [JP]  Japan .................................. 61-315502

[51] Int. Cl.[4] ............................ G06F 3/02; G06F 7/38
[52] U.S. Cl. ................................................ 364/709.16
[58] Field of Search ... 364/200 MS File, 900 MS File, 364/709, 709.12, 709.15, 709.16

[56] References Cited

U.S. PATENT DOCUMENTS

| | | |
|---|---|---|
| 4,282,514 | 8/1981 | Elkin et al. . |
| 4,290,121 | 9/1981 | Boone et al. . |
| 4,473,886 | 9/1984 | Rizk et al. ............................ 364/709 |
| 4,519,045 | 5/1985 | Caldwell et al. .................... 364/709 |
| 4,695,983 | 9/1987 | Oda et al. ............................ 364/709 |
| 4,718,029 | 1/1988 | Morino et al. ...................... 364/709 |

*Primary Examiner*—Eddie P. Chan
*Attorney, Agent, or Firm*—David G. Conlin; Robert M. Asher

[57] ABSTRACT

Disclosed is an electronic computer comprising a keyboard having numerical keys and others, a read only memory (ROM) to store control programs, a random-access memory (RAM) equipped with registers for operation, a CPU to control these devices, wherein a constant register to store constants, an operator storage unit to store operators, and a flag to show whether an operator is positioned before or after a constant are provided in said RAM, and a setting key to set the entered constant and operator and a confirmation key to confirm the predetermined constant and operator are provided in said keyboard, thereby executing an operation preliminarily set in said RAM after processing the desired operation that has been entered.

3 Claims, 5 Drawing Sheets

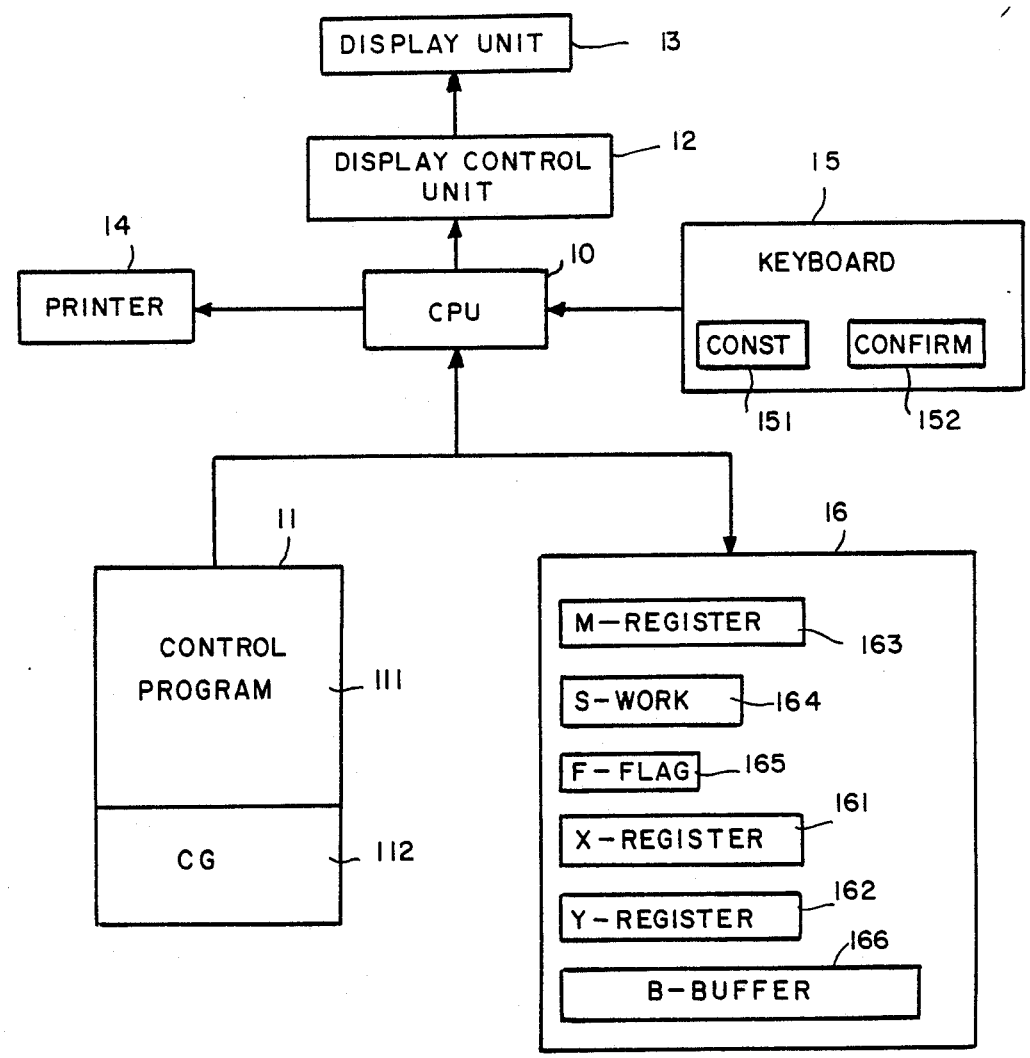
F I G. 1

ELECTRONIC CALCULATOR PROVIDING FLEXIBLE CONSTANT UTILIZATION

BACKGROUND OF THE INVENTION

This invention relates to an electronic computer comprising a keyboard having numerical keys and others, a ROM to store control programs, a RAM equipped with registers for operation, and a CPU to control these devices.

Generally, in ordinary calculations, we often calculate by using a same constant with a same operator with regard to calculated results.

To compute such calculations by conventional electronic computers having a function of constant, for example, the operator and the constant were stored such as "÷3", and only "6+" was entered in calculation thereafter to perform the operation of "6÷3+".

In the conventional computers stated above, however, the sequence of the operator and the constant could not be changed, so that, for example, when "÷3" was set and "6+" was entered, no other calculation could be carried out than the operation of "6÷3+". But as a calculation with a constant, such a calculation as to divide a predetermined constant by a certain calculated result, using for instance "3÷" as a constant, was often required. It was impossible to operate such a calculation by the conventional computer as described above.

In addition, in the conventional computer, it was impossible to confirm the predetermined operator or constant. Accordingly, when the user forgot the predetermined contents, wrong results might be obtained by doing other calculation than the desired one without knowing what were stored.

SUMMARY OF THE INVENTION

To solve the above problems, this invention is intended to present in electronic computer capable of preliminarily setting the sequence of an operator and a constant, and furthermore capable of confirming the preset operator and constant by a confirmation key.

Briefly described, in accordance with the present invention, is a computer comprising a keyboard having numerical keys and others, a ROM to store control programs, a RAM equipped with registers for operations and a CPU to control these devices, wherein a constant register to store constants, an operator storage unit to store operators, and a flag to show whether an operator is positioned before or after a constant are provided in said RAM, and a setting key to set the entered constant and operator and a confirmation key to confirm the predetermined constant and operator are provided in said keyboard, thereby executing an operation preliminarily set in said RAM after processing the desired operation that has been entered.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 1 is a block diagram showing the configuration of computer according to this invention.

DESCRIPTION OF THE PREFERRED EMBODIMENT

Figure 2:
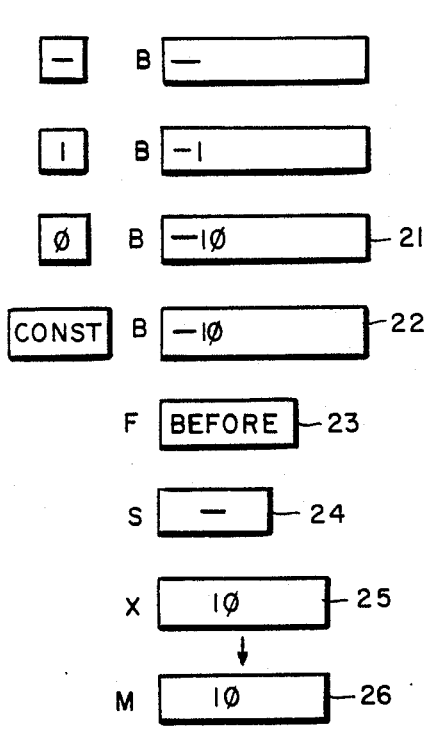
FIG. 2 is a drawing to show the action of setting a constant and an operator in the same computer.

Referring now to the drawings, the computer according to this invention is explained.

FIG. 1 is a block diagram of a computer showing an embodiment of this invention.

Numeral 10 is a CPU to execute the processing of the data according to the control program stored in a ROM 11 which is connected through a bus line of the CPU. Numeral 13 is a display which is driven to display by a display control unit 12 connected to the CPU 10. Numeral 14 is a printer, which is connected to the CPU 10, to print by receiving codes from the CPU 10.

The ROM 11 comprises a control program storage unit 111 to store the programs to control the function of constant or other systems, and a character pattern generator (CG) 112 to develop dot patterns for output from the code information of characters and symbols generated by the CPU 10. Numeral 15 is a keyboard to send coded signals with regard to the operated key to the CPU 10. The keyboard 15 comprises keys for arithmetic operations, numerical keys and keys for functions. Furthermore, as keys for setting or checking of the function of the constant, a CONST key 151 for setting and a CONFIRM key 152 for confirming the set data are provided.

Numeral 16 is a RAM connected to the CPU 10 through a bus line, which composes a working area of this system for control. A B-buffer 166 is a buffer to store the content of the pressed key on the keyboard, and an X-register 161 and a Y-register 162 are the registers for operations. Arithmetic processing is executed by setting desired values for X- and Y-registers 161, 162 respectively and passing a desired program for operation, and the result if returned to the X-register 161.

In order to realize the function of constant of this invention, as an area for storing the content, an M-register 163 to store contents, an S-work 164 to store operators such as +, −, /, * and an F-flag 165 to show whether the operator exists before or after the constant are provided in the RAM 16. In the function of constant according to the present invention, a constant and an operator are predetermined separately so as to be stored in the M-register 163 and the S-work 164 respectively. In the case of calculating a constant with regard to the result of the entered operation, the difference whether the operator exists before or after the constant causes such a difference as described below. For example, in the case of setting the constant as [/][1] [0] [CONST,] when entering an operation [5] [*][2] [+], the result 10 of operation 5×2 is divided by 100 so as to have the same meaning as 10/100, then the answer becomes 0.1. In contrast, in the case of setting the constant as [1] [0][0] [ ] [CONST,] when entering the same operation [5] [ ] [*][2][+], 100 is divided by the result 10 of operation 5×2 so as to be the same meaning as 100/10, and the answer becomes thus 10. In this way, whether the operator exists before or after the constant sometimes renders different operation results, and the F-flag is therefore required.

The processing in the system constructed as stated above is explained herein.

At first, the setting of the function of constant is explained according to the example in FIG. 1. In this case —10 is predetermined as a constant, which is entered by key operation on the keyboard 15. Signals are delivered responding to the key input, which are processed in the CPU 10, and the digitized content is transferred to the B-buffer 166 (21). And when the |CONST| key 151 on the keyboard is pressed, the CPU 10 receives this signal and examines the content of the B-buffer 166 (22). In the first place, the PU 10 examines whether the operator exists at the beginning or at the end of the B-buffer and sends the result to the F-flag 165 (23). In the second place, the CPU 10 transfers the operator to the S-work (24). Then it calculates the part excluding the operator from the B-buffer 166, and the result is stored in the X-register 161 (25). Since the content of the X-register 161 becomes a constant, it is transferred to the M-register 163 (26). Besides, the CPU 10 displays a symbol showing that the constant is determined on the display unit 13 through the display control unit 12. This is the procedure for setting the constant. With reference to in FIG. 1, the preset values are "10" in the M-register 163, "—' in the S-work 164 and "front" in the F-flag 165.

Figure 3:
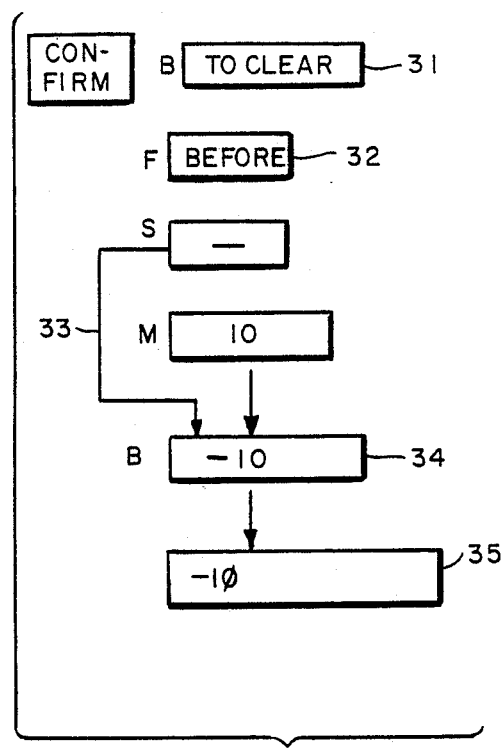
FIG. 3 is a drawing to show the action of confirming the predetermined constant and operator.

Referring next to FIG. 3, the confirmation of the constant is explained below. In this example shown in FIG. 3, —10 is predetermined as a constant, and when |CONFIRM| key 152 on the keyboard 15 is pressed, an input signal is delivered. Then the CPU 10 receives the signal to start processing. In the first place, the CPU 10 clears the content of the F-register 155 (32). If the content is "before" as shown in the example, the content of the S-work 164 which is the operator is transferred to the beginning of the B-buffer 166 through the CPU (33). In addition, the content of the M-register 163 which is the constant value is sent after the operator of the B-buffer 166 (34). To the contrary, when the content of the F-register is examined to be "after", the content of the M-register 163 which is the constant value is transferred to the beginning of the B-buffer through the CPU 10, and in sequence, the content of the S-work 164 is sent to the position after the constant in the B-buffer 166. When the value in the B-buffer 166 is arranged in such a way as described above, the content of the B-buffer is first sent to the CPU 10, where the code is decomposed into CG 112 an sent to the display control unit 12, and is displayed in the display unit (35). In the example, —10 is displayed on the display unit.

Figures 4, 6:
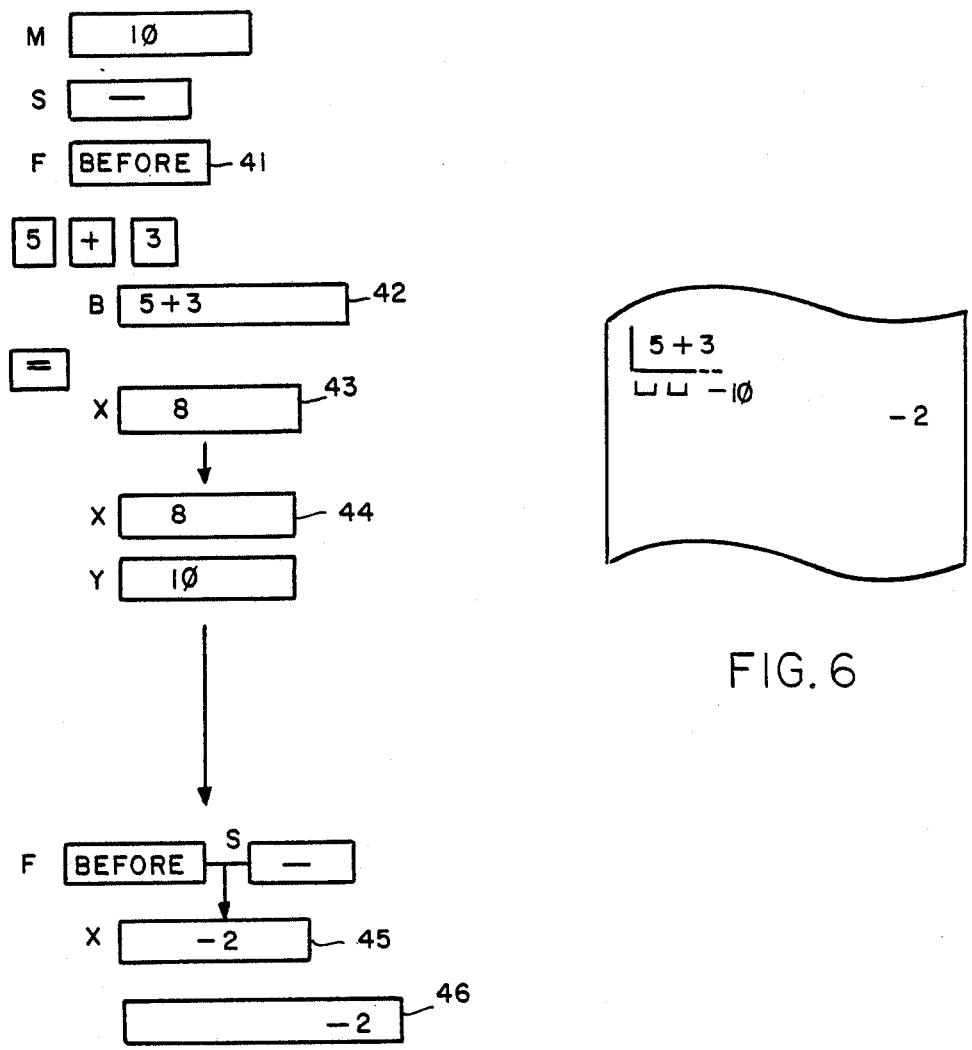
FIG. 4 and FIG. 7 are diagrams to show the action of executing a calculation using a constant.
FIG. 6 is a diagram showing the printed state of the predetermined constant and operator.
Figure 5:
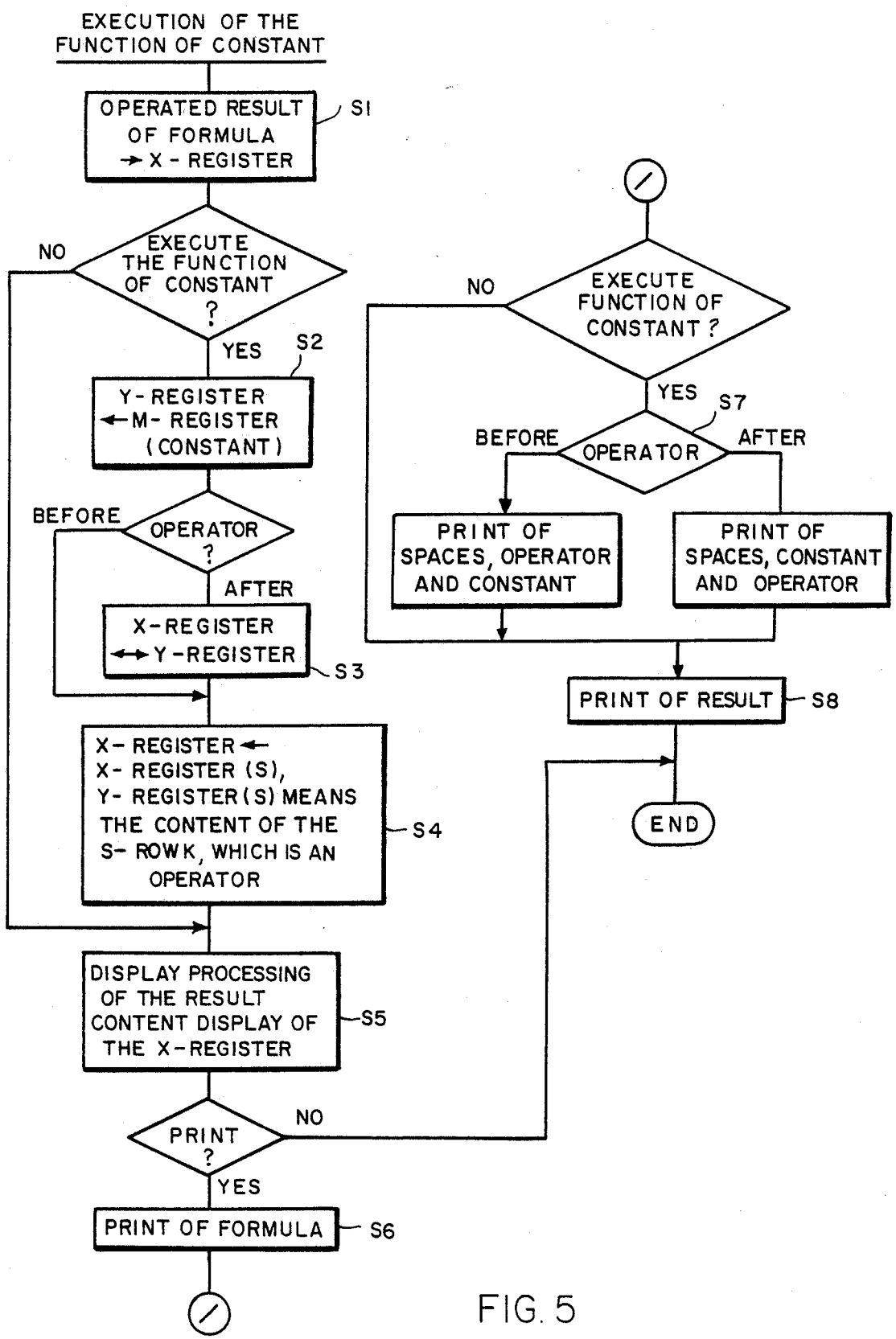
FIG. 5 is a flow chart of execution of the function of constant.

Now, the case of executing the operation with a constant is explained according to the example in FIG. 4. Incidentally, FIG. 5 is a flowchart of executions.

In FIG. 4, —10 is preset as a constant, so that the set data are "10" in the M-register 163, "—" in the S-work 164 and "before" in the F-flag (41). At first, a desired value is entered by pressing the keys on the keyboard 15, and a signal is delivered responding to the input from the keyboard 15, which is processed in the CPU 10 and the content is transferred to the B-buffer 166. For instance, when |5| | |+|3| is pressed, 5+3 is entered in the B-buffer 166 (42), and when the |+| key on the keyboard is successively pressed, a signal is delivered to the CPU 10, where the content of the B-buffer 166 is calculated and entered in the X-register 161 (43). This step is denoted by S1 in FIG. 5. Then the CPU confirms that the constant is predetermined, and the content of the M-register 163 is sent to the Y-register 162 (44) (S2). The content of the F-register 165 is moreover examined, and if it is "after", the contents in the X-register 161 and the Y-register 162 are exchanged with each other (S3). The CPU 10 then runs the program for operation on the control program 111 of the ROM 11 and its result is entered to the X-register 161 (S4). In FIG. 4, as "—" is stored in the S-work 164, 8—10 is here calculated and its result "—2" is entered in the X-register 161 (45). The CPU 10 next decomposes the content of the X-register 161 into CG 112, which is transferred to the display control unit 12 and displayed at the display unit 13. In this example, —2 is displayed (46) (S5), if printing is required, the content of the B-buffer 161 is transferred to the printer 14 through the CPU 10 (S6), and a constant is confirmed to be preset and furthermore the F-flag 165 is examined. When it is found out to be "before" as shown in the example, after transferring a code for spaces to the printer 14, the codes for the operator of the S-work 164 and the constant of the M-register 163 are sent in this order to the printer through the CPU 10. In the example shown in FIG. 4, the spaces 25 are positioned in front as ⊔⊔—10. It is for the purpose of making the print legible by indenting to be distinguished from the entered formula. When the F-flag 165 is "after", by contrast, the codes for the constant of the M-register 163 and the S-work 164 are consequently transferred to the printer 14 after the space code in this order (S7). Finally, the operated result of the X-register 161 is sent to the printer through the CPU 10, which ends the processing. In the example, —2 is transferred and an example of the printing in this case is shown in FIG. 6.

Figure 7:
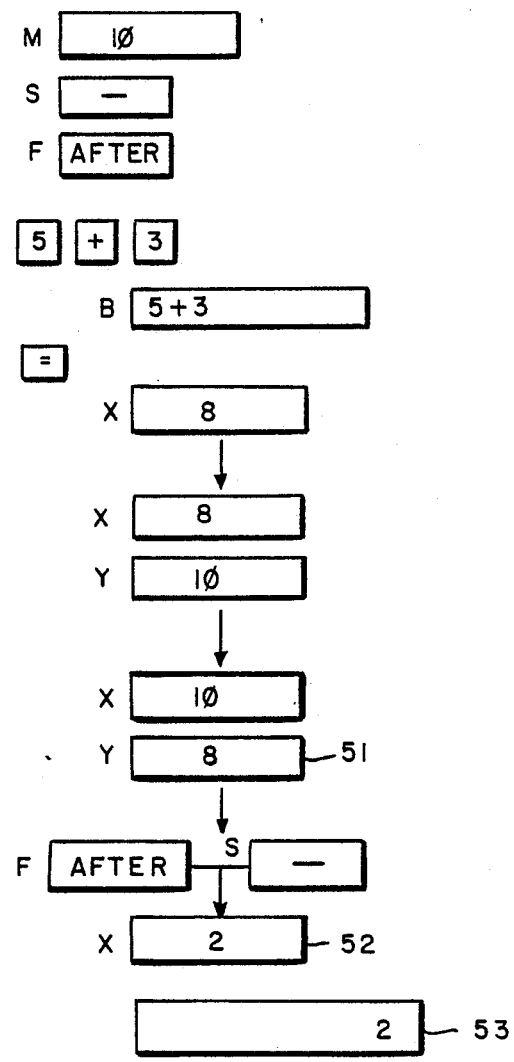

Likewise, the operation in the case of setting an operator after the constant is explained herein. FIG. 7 shows an example of setting 10- as a constant and processing 5+3. Assuming that 10 is set as a constant, the data in the M-register 163 becomes "10", the S-work 164 has "—", and the F-flag 165 has "after", so that the processing is quite the same as that in the case shown in FIG. 4 until the steps S1 and S2 in FIG. 7. At S3, the CPU 10 examines the F-flag 165 to be "after", and then the contents in the X-register 161 and the Y-register are exchanged with each other. In the example, the data in the X-register 161 becomes "10" and that in the Y-register 162 becomes "8" (71). When S4 is executed, which means to calculate 10 —8, the content of the X-register 161, thus, becomes 2 (72). Then the display processing is consequently carried out in the same way as in the case of FIG. 4 to display 2 in the display unit 13 (73).

As described above, the operation method of the constant part differs depending on whether the operator is located before or after the constant, so that even though executing the same operation 5+3, when the constant is set —10 in FIG. 4, it means (5+3)—10 and the result becomes —2, while the constant is set 10— in FIG. 7, it means 10—(5+3) and it results in 2.

Accordingly, the calculation using a constant can be easily executed because the sequence of the constant and the operator can be preliminarily set, and in addition, a display or a print showing that a constant and an operator are preliminarily set can be carried out. Furthermore, if the predetermined content is forgotten, it can be easily confirmed by the display or the print with a simple key operation.

As described so far, this invention can present a computer comprising a keyboard having numerical keys and others, a ROM to store control programs, a RAM equipped with registers for operations and a CPU to control these devices, wherein a constant register to store constants, an operator storage unit to store operators and a flag to show whether an operator is positioned before or after a constant are provided in said RAM, and a setting key to set the entered constant and operator and a confirmation key to confirm the predetermined constant and operator are provided in said keyboard, thereby executing an operation preliminarily set in said RAM after processing the desired operation that has been entered, and a calculation using a constant with a simple operation because the sequence of the constant and the operator can be predetermined, and furthermore, the preset content can be displayed or printed and easily confirmed by a simple key operation even when it is forgotten.

In the computer of this invention, a constant and an operator should first be predetermined. To do this, a signal entered by the keyboard is stored in the RAM, the constant and the operator are stored in the constant register and the operator storage unit respectively when the preset key is pressed, whether the operator exists before or after the constant is judged by the CPU, and the flag is set or reset. To confirm the preset constant and operator, by operating the confirmation key on the keyboard, the content of the constant register is transferred to the register for operation and at the same time, the operator stored in the operator storage unit is transferred before or after the constant in the register for operation depending on the flag state. The content in the register for operation is delivered to the display or the printer. After setting the constant and the operator, to calculate by using this function of constant, a numeral or numerical formula is entered by the keyboard in the same way as in an ordinary calculation, and in the case that only a numeral is entered, the numeral and the preset constant are calculated by the set operator. While a numerical formula is entered, after calculating the entered formula, its result and the preset constant are operated in the same way.

While only certain embodiments of the present invention have been described, it will be apparent to those skilled in the art that various changes and modifications may be made therein without departing from the spirit and scope of the present invention as claimed.

What is claimed is:

1. An electronic calculator comprising a keyboard having numerical keys and others, output means, a read only memory (ROM) to store control programs, a random-access memory (RAM), and a CPU to control these devices, wherein said RAM provides a constant register to store constants, an operator storage unit to store operators, and a flag storage unit to store a flag to show whether an operator is positioned before or after a constant, wherein said keyboard includes a setting key to set an entered constant and operator and includes also a confirmation key which initiates operation of said output means to generate characters confirming the order of entry of the predetermined constant and operator, wherein, according to the contents of the flag storage unit in RAM indicative of the position of the operator, the sequence of subsequent calculations employing the constant and operator is changed.

2. The electronic calculator of claim 1, further comprising means for outputtting the contents of said constant register and operator storage unit.

3. An electronic calculator comprising a keyboard having numerical keys and others, output means, a read only memory (ROM) to store control programs, a random-access memory (RAM), and a CPU to control these devices, wherein said RAM provides a constant register to store constants, an operator storage unit to store operators, and a flag storage unit to store a flag to show whether an operator is positioned before or after a constant wherein said keyboard includes a setting key to set an entered constant and operator, wherein, according to the contents of the flag storage unit in RAM indicative of the position of the operator, the sequence of subsequent calculations employing the constant and operator is changed.

* * * * *